Figure 1:
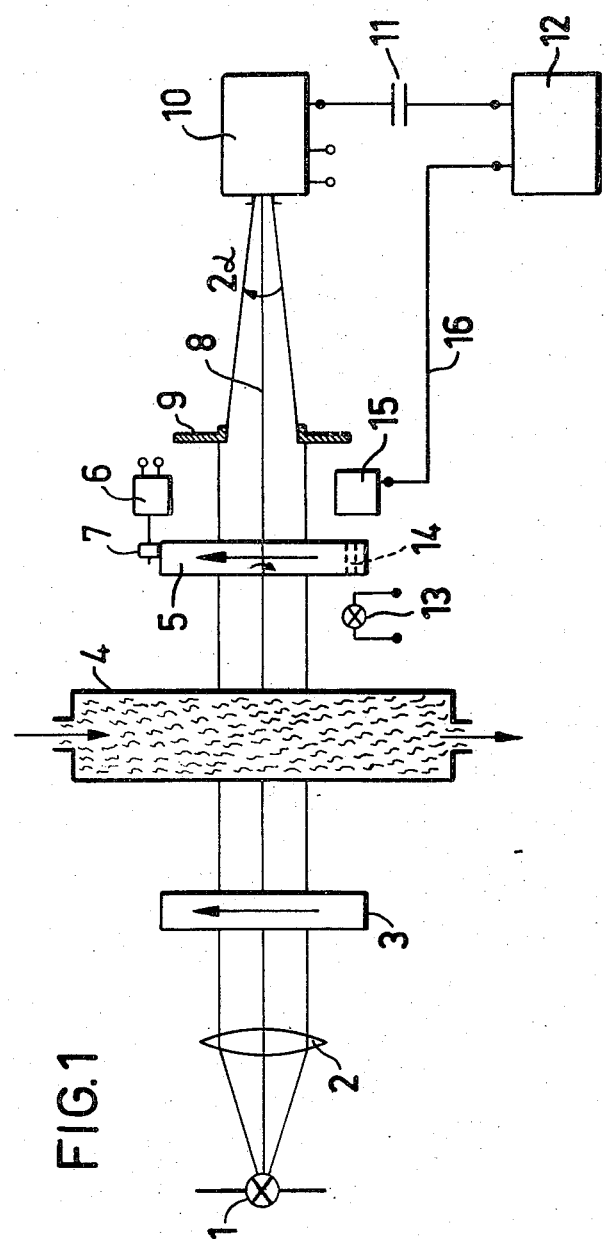

United States Patent [19]
Hill et al.

[11] 3,856,408
[45] Dec. 24, 1974

[54] APPARATUS FOR MEASURING THE OPTICALLY BIREFRINGENT PROPERTIES OF A LIQUID SAMPLE

[75] Inventors: Jan Erik Hill, Solna; Erik Lennart Eriksson, Vallentuna; Mats Lennartsson, Stockholm, all of Sweden

[73] Assignee: Svenska Traforskningsinstitutet, Stockholm, Sweden

[22] Filed: May 25, 1973

[21] Appl. No.: 363,816

[30] Foreign Application Priority Data
June 5, 1972  Sweden.............................. 7353/72

[52] U.S. Cl.................................. 356/114, 250/225
[51] Int. Cl. ........................................... G01n 21/40
[58] Field of Search ....... 356/114, 117, 34; 250/225

[56] References Cited
UNITED STATES PATENTS
2,861,493   11/1958   Landegren..................... 250/225 X
3,041,921   7/1962    Pickles et al.................... 250/225 X

*Primary Examiner*—Ronald L. Wibert
*Assistant Examiner*—Paul K. Godwin
*Attorney, Agent, or Firm*—Cushman, Darby & Cushman

[57] ABSTRACT

The invention relates to an apparatus for measuring the concentration in a liquid solution. Said apparatus can also be used for measuring the concentration of particles in a suspension. By transluminating the object to be measured with plane polarized light, the optically birefringent properties of the object are utilized. After having passed the object and a polarizer with a rotating polarization plane, the light is received by a detector which generates a signal that is compared with a periodic reference signal which is in synchronism with the rotating polarization plane. The phase difference between said signals is a measure of the concentration of the object.

3 Claims, 2 Drawing Figures

APPARATUS FOR MEASURING THE OPTICALLY BIREFRINGENT PROPERTIES OF A LIQUID SAMPLE

The invention relates to a method for the measurement of the concentration in a liquid solution existing or flowing through a measuring zone or of components in said solution, or to a method for the measurement of the concentration of particles in a suspension, the solution or components therein or the particles in the suspension having optically birefringent properties and the measuring zone being transilluminated with plane polarized light, which after the passage through the measuring zone passes a polarizer and hits a detector.

Several methods are known for optical measurement of concentration. These methods substantially use some of the following phenomena in connection with transillumination of a measuring zone with a streaming solution or suspension: birefringence, scattering or refraction. The use of the last mentioned two phenomena can cause disadvantages, of for instance, it is desired to determine the concentration of suspended particles. Thereby changes of intensity are utilized and the measuring result is, for instance, dependent on the absorption of the light in the solution in general or of its color, which can vary. The firstmentioned phenomenon is not necessarily influenced by these sources of error, since it primarily results in a phase changing effect.

The fact that certain solutions (for instance sugar solutions) and suspended particles (for instance cellulose fibres) when being transilluminated with plane polarized light have the property of rotating the plane of polarization, constitutes the basis of the invention. Information about the rotation of the plane of polarization can elucidate the concentration of a solution or the content of suspended particles. This is for instance apparent from the Swedish Patent specification No. 312,455.

The disadvantages with previously known methods are avoided by a method according to the invention which in connection with the method according to the introductory portion of this description is characterized therein that the light after having passed the measuring zone is passed through the polarizer, the polarization plane of which during the measurement rotates with a constant speed around an axis, preferably being parallel to the optical axis of the system, and thereafter hitting the detector, and that a periodic reference quantity with well defined time properties is generated, which is in synchronism with the rotation of the polarization plane, whereafter the signal from the detector and the periodic reference quantity are compared along a common time axis and the phase difference is used as a measurement result of the concentration in the measuring zone.

In order to obtain, when measuring, a good signal-to-noise ratio, the light cone which after the polarization is brought to hit the detector, must not have too large a top angle. The angle must thus be below 40°. This can be achieved by the light passing through an aperture.

The reference quantity can according to the invention be generated for instance from a separate photo detector, which is illuminated by a light beam from a light source through an opening in the rotating polarizer outside its active zone.

An apparatus operating according to the method of the invention will be described in greater detail in connection with FIG. 1 in the enclosed drawing. In FIG. 2 a voltage-time diagram for explanation of the operation of the invention is shown.

Figure 2:
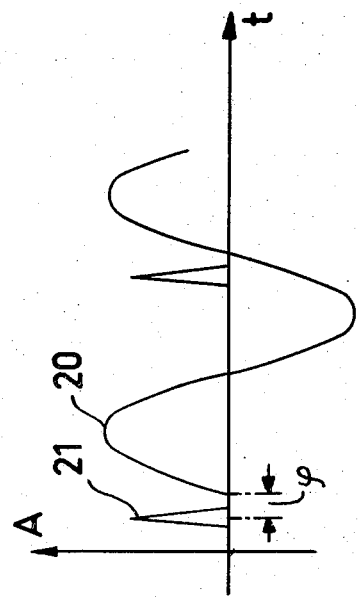

According to FIG. 1 the light is passed from a light source 1 through an optical device 2, which gives a substantially parallel luminous flux. This passes through a polarizer 3 before reaching the measuring zone 4. Therein a solution or a suspension is to be found, for instance a fibre suspension, the concentration of which is to be determined. The plane polarized light reaches, after having passed the measuring zone, a rotating polarizer 5. In FIG. 1 a method to bring said polarizer to rotate, viz. by aid of an electric motor 6 is mentioned, which by means of a gear wheel or roller 7 abuts the outer circumference of the polarizer. The polarizer is so mounted in its bearing that it will rotate around an imaginary axis, being parallel to or preferably coinciding with the optical axis 8 of the system. After having passed the polarizer 5, the light passes an aperture 9 and incides within an angle interval $2\alpha$, wich preferably is below 40°, against the sensitive part of a photo detector 10.

The output signal of the photo detector gives via a capacitor 11 an alternating voltage, which is supplied to an input of a phase meter 12. A reference quantity is supplied to another input thereof, which according to the invention is obtained synchronously with the rotation of the polarization filter, in order to get a periodic quantity with welldefined zero-axis crossings. For this purpose a light source 13 according to FIG. 1 is brought to send a light beam through an opening 14 in the rotation polarizer 5 outside its active area towards a photodetector 15. Through a wire 16 the output quantity of said photo detector is supplied to the other input of the phase meter 12.

In FIG. 2, along a time axis $t$ two voltages with amplitude values A are drawn. The substantially sinusoidal voltage curve 20 corresponds to the voltage coupled via the capacitor 11 in FIG. 1 to one of the inputs of the phase meter 12. A voltage which mainly appears in the shape of spike pulses 21 corresponds to the voltage on the line 16 generated by the photo detector 15. Between these voltages a phase difference $\phi$ appears, which is monotonously dependent on the concentration of the birefringent medium in the measuring zone 4.

In the schematic presentation in FIG. 1 and in the description of this Figure certain necessary details have been omitted. Thus the power supply for both the light sources 1 and 13 and of the motor 6 and the photo detectors 10 and 15 is required. Moreover, necessary amplifiers are part of the electric circuits without such circuits having been shown in a greater detail. The phase comparison, i.e., the measuring of the angle $\phi$ can take place in different ways and a quantity corresponding to said angle can be used either as a measuring value or as an input value for the control of the concentration of a suspension or a solution, if a sample thereof is led through the measuring zone 4.

Instead of the described spike pulses 21 other voltages with well-defined time propoerties, such as a rectangular wave, can be used.

What we claim is:

1. An apparatus for measuring the optically birefringent properties of a liquid sample, comprising a source of parallel light, a first fixed polarized for plane polarizing the light, a sample holder disposed to be transilluminated by said plane polarized light, analyzing means comprising a second polarizer rotating at a constant speed and disposed to receive said plane polarized light, a first photoelectric detector for receiving the light transmitted by said rotatable polarizer, means for generating a periodic electric reference signal with a steep edge in synchronism with the rotation of the rotatable polarizer, phase comparing means receiving said reference signal and an output signal from the photoelectric detector, and means for forming the phase difference between said signals supplied to the comparing means along a common time axis.

2. The apparatus of claim 1 which includes a second source of light, chopper means comprising at least one opening at the periphery of the rotatable polarizer outside its active zone, a second photoelectric detector for receiving the light from said second source traversing said at least one opening, and means for deriving said periodic electric reference signal with a steep edge by said second photoelectric detector.

3. Apparatus as in claim 1 which includes a light limiting aperture on said first photoelectric detector for giving an angle of incidence smaller than about 40°.

* * * * *